(12) United States Patent
Craton et al.

(10) Patent No.: US 12,234,389 B2
(45) Date of Patent: Feb. 25, 2025

(54) SILICONE ELASTOMERS BY FREE RADICAL MEDIATED CURE

(71) Applicant: 3M INNOVATIVE PROPERTIES COMPANY, St. Paul, MN (US)

(72) Inventors: Michele A. Craton, Cottage Grove, MN (US); Rajdeep S. Kalgutkar, Woodbury, MN (US); Kim M. Vogel, Lake Elmo, MN (US); Dennis E. Vogel, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 187 days.

(21) Appl. No.: 17/764,744

(22) PCT Filed: Sep. 25, 2020

(86) PCT No.: PCT/IB2020/058998
§ 371 (c)(1),
(2) Date: Mar. 29, 2022

(87) PCT Pub. No.: WO2021/064534
PCT Pub. Date: Apr. 8, 2021

(65) Prior Publication Data
US 2022/0332898 A1    Oct. 20, 2022

Related U.S. Application Data

(60) Provisional application No. 62/909,992, filed on Oct. 3, 2019.

(51) Int. Cl.
| | |
|---|---|
| C09J 183/04 | (2006.01) |
| C08G 77/00 | (2006.01) |
| C08G 77/16 | (2006.01) |
| C09J 183/06 | (2006.01) |

(52) U.S. Cl.
CPC ............ *C09J 183/04* (2013.01); *C08G 77/16* (2013.01); *C08G 77/70* (2013.01); *C09J 183/06* (2013.01)

(58) Field of Classification Search
CPC ....... C08L 83/04; C09D 183/04; C09J 183/04
See application file for complete search history.

(56) References Cited

U.S. PATENT DOCUMENTS

| | | | |
|---|---|---|---|
| 3,808,006 A | 4/1974 | Smith | |
| 3,816,282 A | 6/1974 | Viventi | |
| 4,058,401 A | 11/1977 | Crivello | |
| 4,069,055 A | 1/1978 | Crivello | |
| 4,070,526 A | 1/1978 | Colquhoun et al. | |
| 4,101,513 A | 7/1978 | Fox et al. | |
| 4,161,478 A | 7/1979 | Crivello | |
| 4,290,869 A | 9/1981 | Pigeon | |
| 4,547,431 A | 10/1985 | Eckberg | |
| 4,558,147 A | 12/1985 | Eckberg et al. | |
| 4,576,999 A | 3/1986 | Eckberg | |
| 4,617,238 A | 10/1986 | Crivello et al. | |
| 4,952,657 A | 8/1990 | Riding et al. | |
| 5,134,203 A | 7/1992 | Hockemeyer et al. | |
| 5,260,348 A | 11/1993 | Shepherd et al. | |
| 5,369,205 A | 11/1994 | Eckberg et al. | |
| 5,387,465 A | 2/1995 | Van Vleck | |
| 5,397,813 A | 3/1995 | Eckberg et al. | |
| 5,576,356 A | 11/1996 | Leir et al. | |
| 5,721,290 A | 2/1998 | Eckberg et al. | |
| 5,747,172 A | 5/1998 | Crivello | |
| 6,204,350 B1 | 3/2001 | Liu et al. | |
| 6,576,393 B1 | 6/2003 | Sugita et al. | |
| 6,780,484 B2 | 8/2004 | Kobe et al. | |
| 6,835,422 B2 | 12/2004 | Kobe et al. | |
| 7,052,131 B2 | 5/2006 | McCabe et al. | |
| 7,163,769 B2 | 1/2007 | Cheben et al. | |
| 7,186,773 B2 | 3/2007 | Araki et al. | |
| 7,550,247 B2 | 6/2009 | Nakashima et al. | |
| 7,618,685 B2 | 11/2009 | Tanaka et al. | |

(Continued)

FOREIGN PATENT DOCUMENTS

| | | |
|---|---|---|
| CN | 103571310 B | 11/2015 |
| EP | 345575 A1 * | 12/1989 |

(Continued)

OTHER PUBLICATIONS

"Silicones", Encyclopedia of Polymer Science and Technology, 2003, vol. 11, Wiley—US, pp. 765-841, XP007918236.
Crivello, "Cationic Polymerization—Iodonium and Sulfonium Salt Photoinitiators", Advances in Polymer Science, 1984, vol. 62, pp. 01-48.
International Search Report for PCT Application No. PCT/IB2020/058998 mailed on Mar. 29, 2021, 6 pages.
Kochi, "Carbonium Ions From Alkyl Radicals By Electron Transfer", Journal of the American Chemical Society, 1968, vol. 90, No. 15, pp. 4038-4051.
Ledwith, "Possibilities For Promoting Cationic Polymerization By Common Sources of Free Radicals", Polymer, 1978, vol. 19, pp. 1217-1219.

(Continued)

*Primary Examiner* — Marc S Zimmer
(74) *Attorney, Agent, or Firm* — Kathleen B. Gross

(57) ABSTRACT

Curable compositions of this disclosure comprise a mixture of: a silanol, a free radical initiator, an iodonium salt; and optionally an alkoxysilane, and/or an MQ resin, and/or (meth)acrylate monomer(s). In another aspect, cured compositions of this disclosure comprise: a cured silicone, a free radical initiator or residue thereof, an iodonium salt or residue thereof; and optionally a poly(meth)acrylate and/or an MQ resin, which may comprise the cured silicone. In another aspect, cured compositions of this disclosure comprise: a continuous phase of cured silicone, a discontinuous phase of poly(meth)acrylate inclusions, and optionally an MQ resin, which may comprise the cured silicone. The poly(meth)acrylate inclusions may have an average diameter of less than 1.0 micrometer or smaller. The compositions may be pressure sensitive adhesives. The curable and cured compositions may be solvent-free.

20 Claims, 4 Drawing Sheets

(56) References Cited

U.S. PATENT DOCUMENTS

| | | | |
|---|---|---|---|
| 7,655,376 | B2 | 2/2010 | Anderson et al. |
| 7,666,921 | B2 | 2/2010 | McCabe et al. |
| 7,691,916 | B2 | 4/2010 | McCabe et al. |
| 8,092,905 | B2 | 1/2012 | Kleiman-Shwarsctein et al. |
| 8,431,669 | B2 | 4/2013 | McCabe et al. |
| 8,512,934 | B2 | 8/2013 | Hayoz et al. |
| 8,541,481 | B2 | 9/2013 | Determan et al. |
| 8,580,477 | B2 | 11/2013 | Knapp et al. |
| 8,822,560 | B2 | 9/2014 | Seth et al. |
| 8,889,344 | B2 | 11/2014 | Prokopowicz et al. |
| 8,927,627 | B2 | 1/2015 | Feder et al. |
| 9,958,577 | B2 | 5/2018 | McCabe et al. |
| 2003/0152779 | A1 | 8/2003 | Kondo et al. |
| 2005/0124712 | A1 | 6/2005 | Anderson et al. |
| 2007/0003702 | A1 | 1/2007 | Nishida et al. |
| 2008/0032052 | A1 | 2/2008 | Kourtakis et al. |
| 2008/0032053 | A1 | 2/2008 | Kourtakis et al. |
| 2008/0057251 | A1 | 3/2008 | Griswold et al. |
| 2008/0064815 | A1 | 3/2008 | Issari et al. |
| 2008/0305457 | A1 | 12/2008 | Ali et al. |
| 2009/0318578 | A1 | 12/2009 | Versteeg et al. |
| 2010/0311868 | A1 | 12/2010 | Bekiarian et al. |
| 2011/0020657 | A1 | 1/2011 | Chang et al. |
| 2012/0199994 | A1 | 8/2012 | Richert et al. |
| 2013/0158148 | A1 | 6/2013 | Tsugane et al. |
| 2014/0255832 | A1 | 9/2014 | Qiu |
| 2014/0296441 | A1 | 10/2014 | Hood et al. |
| 2014/0363603 | A1 | 12/2014 | Keitetelgenbüscher et al. |
| 2015/0005465 | A1 | 1/2015 | Hood et al. |
| 2015/0133576 | A1 | 5/2015 | Croutxe-Barghorn et al. |
| 2015/0159039 | A1 | 6/2015 | Croutxe-Barghorn et al. |

FOREIGN PATENT DOCUMENTS

| | | | | |
|---|---|---|---|---|
| EP | 1004613 | A2 | 5/2000 | |
| GB | 2066278 | A * | 7/1981 | ............... C08K 5/00 |
| GB | 2066278 | B | 10/1984 | |
| GB | 2151243 | A * | 7/1985 | ............ C08G 77/38 |
| JP | 2004256609 | A | 9/2004 | |
| JP | 2004263062 | A | 9/2004 | |
| JP | 2007009080 | A | 1/2007 | |
| JP | 2007031596 | A | 2/2007 | |
| JP | 2008189821 | A | 8/2008 | |
| JP | 2012116989 | A | 6/2012 | |
| WO | 2010077606 | A1 | 7/2010 | |
| WO | WO 2012/017660 | A1 * | 2/2012 | |
| WO | 2012153776 | A1 | 11/2012 | |
| WO | 2014074336 | A1 | 5/2014 | |
| WO | 2014074372 | A1 | 5/2014 | |
| WO | 2014171485 | A1 | 10/2014 | |
| WO | 2014204010 | A1 | 12/2014 | |
| WO | WO-2020187685 | A1 * | 9/2020 | ........... C09D 183/04 |

OTHER PUBLICATIONS

Mazurek, "Novel Materials Based on Silicone-Acrylate Copolymer Networks", Journal of Applied Polymer Science, 2001, vol. 80, No. 2, pp. 159-180.

Rankin, "Importance of Cyclization during the Condensation of Hydrolyzed Alkoxysilanes", Chemistry of materials, 1998, vol. 10, No. 8, pp. 2037-2040.

Rasoul, "Photochemical and thermal cationic polymerizations promoted by free radical initiators", Polymer, 1978, vol. 19, No. 10, pp. 1219-1222.

Rasoul, "Thermal and Photochemical Cationic Polymerizations Induced by AgPF6 in the Presence of Free Radical Initiators", Polymer Bulletin, 1978, vol. 1, No. 1, pp. 1-6.

* cited by examiner

SILICONE ELASTOMERS BY FREE RADICAL MEDIATED CURE

FIELD OF THE DISCLOSURE

This disclosure relates to curable compositions comprising: a silanol, a free radical initiator, an iodonium salt; and optionally an alkoxysilane, and/or an MQ resin, and/or (meth)acrylate monomer(s); as well as compositions such as may be obtained by cure thereof.

BACKGROUND OF THE DISCLOSURE

The following references may be relevant to the general field of technology of the present disclosure: GB 2,066,278; JP 2004/263062; U.S. Pat. No. 7,163,769; US 2013/0158148; U.S. Pat. Nos. 4,547,431; 5,397,813; 7,052,131; 7,666,921; 7,691,916; 8,431,669; 9,958,577; WO 2010/077606; WO 2014/074336; WO 2014/204010; Ledwith, A., "Possibilities for promoting cationic polymerization by common sources of free radicals", *Polymer*, vol. 19, p. 1217 (1978); Crivello, J. V., "Cationic Polymerization—Iodonium and Sulfonium Salt Photoinitiators", *Adv. Polym. Sci.*, vol. 62, p. 1 (1984); Abdul-Rasoul, F. A. M., Ledwith, A., Yagci, Y., "Photochemical and thermal cationic polymerizations promoted by free radical initiators", *Polymer*, vol. 19, p. 1219 (1978); Abdul-Rasoul, F. A. M., Ledwith, A., Yagci, Y., "Thermal and Photochemical Cationic Polymerizations Induced by $AgPF_6$ in the Presence of Free Radical Initiators", *Polymer Bulletin*, vol. 1, p. 1 (1978); Kochi, J. K. and Bemis, A.; *J. Am. Chem. Soc.*, vol. 90, p. 4038 (1968); Rankin, S. E., Macosko, C. W., McCormick, A. V.; *Chem. Mater.*, vol. 10, p. 2037 (1998); and M. Mazurek, D. J. Kinning, T. Kinoshita, "Novel Materials Based on Silicone-Acrylate Copolymer Networks", *Journal of Applied Polymer Science*, vol. 80, p. 159-180 (2001).

SUMMARY OF THE DISCLOSURE

Briefly, the present disclosure provides curable compositions comprising a mixture of: a) a silanol; b) a free radical initiator; and c) an iodonium salt. The curable compositions may additionally comprise: d) an alkoxysilane, which may comprise one, two, or more trialkoxysilane groups. In some embodiments, the silanol may be a polysiloxane comprising silanol groups, such as a silanol-terminated polysiloxane. In various embodiments, the free radical initiator may be one or more photoinitiators, one or more thermal initiators, or combinations thereof. In various embodiments, the iodonium salt may be a diaryliodonium salt, may comprises one or more C1-C20 linear or branched alkyl chain substituents, may have a low nucleophilicity counter ion such as hexafluoroantimonate ($SbF_6^-$), hexafluorophosphate ($PF_6^-$), or triflate ($CF_3SO_3^-$), or combinations of these conditions. The curable compositions may optionally include one or more MQ resins. The curable compositions may optionally include one or more (meth)acrylate monomers, which may include multifunctional (meth)acrylate crosslinking monomers comprising two or more (meth)acrylate functional groups. In some embodiments, the curable compositions comprise essentially no amount of common solvents. Additional embodiments of the curable compositions of the present disclosure are described below under "Selected Embodiments."

In another aspect, the present disclosure provides compositions comprising: a) a cured silicone; b) a free radical initiator or residue thereof; and c) an iodonium salt or residue thereof. The compositions may optionally include one or more poly(meth)acrylates. The compositions may optionally include one or more MQ resins, which may comprise the cured silicone. In some embodiments, the compositions comprise essentially no amount of common solvents. In some embodiments, the compositions are pressure sensitive adhesives (PSA's). Additional embodiments of the compositions of the present disclosure are described below under "Selected Embodiments."

In another aspect, the present disclosure provides compositions comprising: a) a continuous phase of cured silicone; and b) a discontinuous phase of poly(meth)acrylate inclusions. In various embodiments, the poly(meth)acrylate inclusions may have an average diameter of less than 1.0 micrometer, less than 0.9 micrometer, less than 0.8 micrometer, less than 0.7 micrometer, less than 0.6 micrometer, or less than 0.5 micrometer. The compositions may optionally include one or more MQ resins, which may comprise the cured silicone. In some embodiments, the compositions comprise essentially no amount of common solvents. In some embodiments, the compositions are pressure sensitive adhesives (PSA's). Additional embodiments of the compositions of the present disclosure are described below under "Selected Embodiments."

The preceding summary of the present disclosure is not intended to describe each embodiment of the present invention. The details of one or more embodiments of the invention are also set forth in the description below. Other features, objects, and advantages of the invention will be apparent from the description and from the claims.

In this application:

"common solvents" refers to low molecular weight organic liquids commonly used as solvents by practitioners in the art, which may include aliphatic and alicyclic hydrocarbons (e.g., hexane, heptane, and cyclohexane), aromatic solvents (e.g., benzene, toluene, and xylene), ethers (e.g., diethyl ether, glyme, diglyme, diisopropyl ether, and tetrahydrofuran), esters (e.g., ethyl acetate and butyl acetate), alcohols (e.g., ethanol and isopropyl alcohol), ketones (e.g., acetone, methyl ethyl ketone, and methyl isobutyl ketone), sulfoxides (e.g., dimethyl sulfoxide), amides (e.g., N,N-dimethylformamide, N,N-dimethylacetamide, and N-methyl-2-pyrrolidone), halogenated solvents (e.g., methylchloroform, 1,1,2-trichloro-1,2,2-trifluoroethane, trichloroethylene, and trifluorotoluene), and mixtures thereof; providing that "common solvents" excludes species that act as monomers or otherwise as reactants in a given composition;

"directly bound" refers to two materials that are in direct contact with each other and bound together;

"essentially no amount" of a material in a composition may be substituted with "less than 5 weight percent", "less than 4 weight percent", "less than 3 weight percent", "less than 2 weight percent", "less than 1 weight percent", "less than 0.5 weight percent", "less than 0.1 weight percent", or "no amount";

"(meth)acrylate" includes, separately and collectively, methacrylate and acrylate;

"MQ resin" means a silicone polymeric resin principally comprised of M structural units (i.e., monovalent $R_3SiO_{1/2}$ units) and Q structural units (i.e., tetravalent $SiO_{4/2}$ units), where each R is independently selected from small substituents, typically selected from hydrogen, hydroxyl, halogens, straight-chain, branched, or cyclic alkyl groups comprising 1-8 carbons, straight-chain, branched, or cyclic alkoxy groups comprising 1-8 carbons, aromatic groups comprising 1-8 carbons, aryloxy groups comprising 1-8 carbons; more typically selected from phenyl or methyl; and most typically methyl;

"normal temperature and pressure" or "NTP" means a temperature of 20° C. (293.15 K, 68° F.) and an absolute pressure of 1 atm (14.696 psi, 101.325 kPa); and "pressure sensitive adhesive" or "PSA" means materials having the following properties: a) tacky surface, b) the ability to adhere with no more than finger pressure, c) the ability to adhere without activation by any energy source, d) sufficient ability to hold onto the intended adherend, and preferably e) sufficient cohesive strength to be removed cleanly from the adherend; which materials typically meet the Dahlquist criterion of having a storage modulus at 1 Hz and room temperature of less than 0.3 MPa.

All scientific and technical terms used herein have meanings commonly used in the art unless otherwise specified.

As used in this specification and the appended claims, past tense verbs such as "coated" are intended to represent structure, and not to limit the process used to obtain the recited structure, unless otherwise specified.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

DETAILED DESCRIPTION

Figure 1:
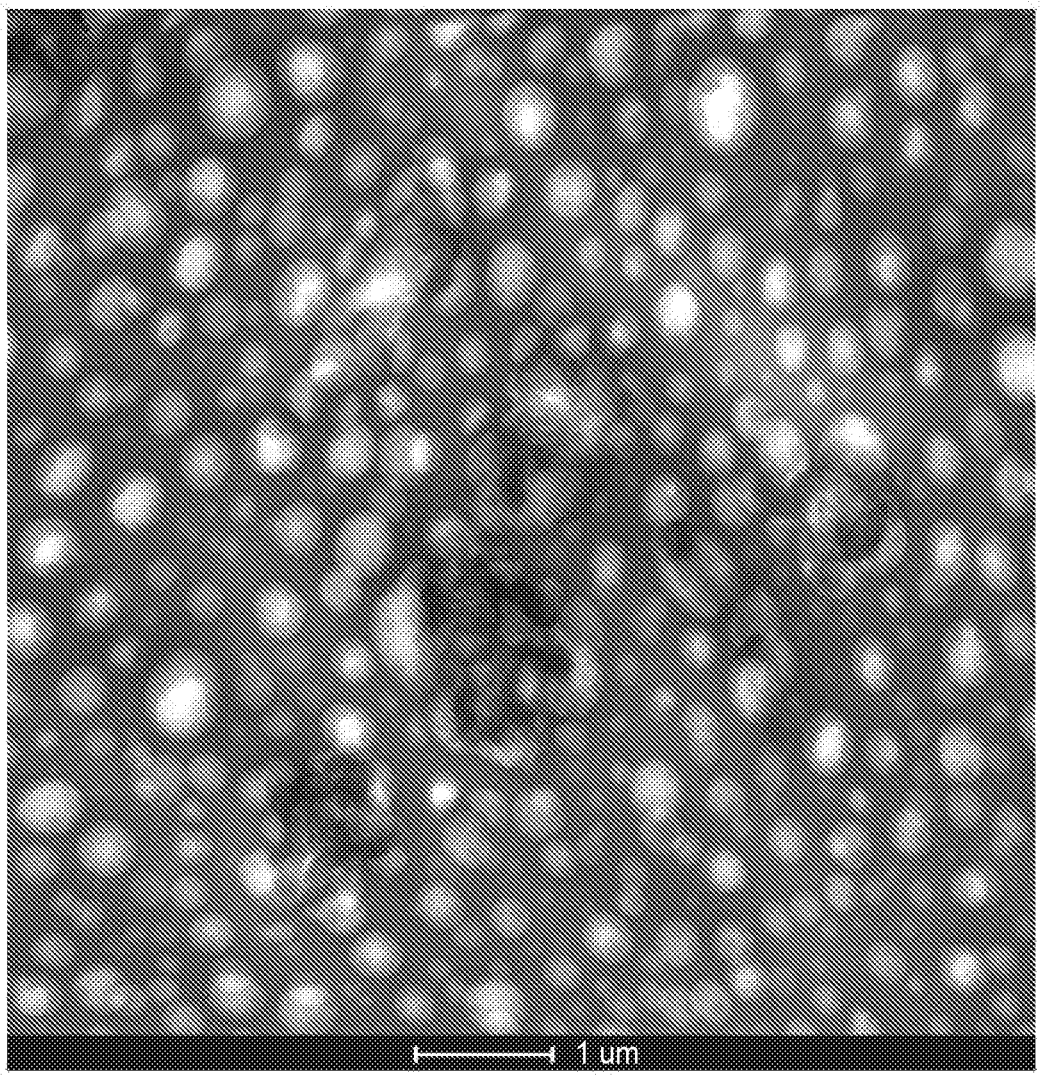
FIG. 1 is a Bright Field Scanning Transmission Electron Microscopy image of a thin section of a silicone elastomer according to one embodiment of the present disclosure taken at a magnification of 14,000×, as described in the Examples section herein.

The present disclosure provides curable compositions and the materials obtained by cure of the curable compositions, which may be silicones or silicones comprising (meth) acrylate materials. The cured materials may be elastomers and may optionally be pressure sensitive adhesives (PSA's). In the case of silicones comprising (meth)acrylate materials, the cured materials may comprise a continuous phase of principally silicone material and a discontinuous phase of principally acrylate material.

The curable compositions may contain essentially no amount of common solvents. The curable compositions may be radiation curable, such as UV curable, may be heat curable, or may be both.

The curable compositions comprise a mixture of at least the following components: a) a silanol; b) a free radical initiator; and c) an iodonium salt. In some embodiments, the curable composition additionally comprises: d) an alkoxysilane. In some embodiments, the curable composition additionally comprises: e) an MQ resin. In some embodiments, the curable composition additionally comprises: f) one or more (meth)acrylate monomers. In some embodiments, the curable composition additionally comprises: g) one or more multifunctional (meth)acrylate crosslinking monomers comprising two or more (meth)acrylate functional groups.

Without wishing to be bound by theory, it is believed that a condensation cure of the silanol-containing components may be catalyzed by a Brönsted acid generated when the iodonium salt is reduced by free-radicals generated by activation of the free radical initiator. When (meth)acrylate monomers are also present, elements of the same mechanism may also polymerize the (meth)acrylate monomers. This may result in the unusual structure depicted in the electron micrographs of FIGS. 1 & 2, which comprises a continuous phase of principally silicone material and a discontinuous phase of principally acrylate material on a sub-micrometer scale.

Any suitable silanol may be used in the practice of the present disclosure. Suitable silanols may be according to the formula $R_3$—Si—OH, where each R is independently selected from small substituents, typically selected from hydrogen, hydroxyl, halogens, straight-chain, branched, or cyclic alkyl groups comprising 1-8 carbons, straight-chain, branched, or cyclic alkoxy groups comprising 1-8 carbons, aromatic groups comprising 1-8 carbons, aryloxy groups comprising 1-8 carbons; more typically selected from phenyl or methyl; and most typically methyl; or may comprise a link to a larger moiety such as a polymer, such as a polysiloxane or silicone. In various embodiments, the silanol may be a polysiloxane comprising silanol groups, a silanol-terminated polysiloxane, a silanol-terminated polydialkylsiloxane, a silanol-terminated polydimethylsiloxane, or a silanol-terminated polydiphenylsiloxane. Suitable silanols may include silanol terminated polydimethylsiloxanes sold under the tradename Xiameter™ by Dow, Midland, MI; or silanols available from Gelest Inc., Morrisville, PA.

Any suitable free radical initiator may be used in the practice of the present disclosure. Suitable free radical initiators may include photoinitiators, such as UV photoinitiators, thermal free-radical initiators, and thermal polymerization initiators. Typically neither the free radical initiator nor the free radical it generates are Brönsted bases, as this will undercuts the purpose of generating a Brönsted acid by reduction of the iodonium salt. Typically the free radical initiator generates free radicals having an oxidation potential sufficient to reduce the iodonium salt, that is, the sum of oxidation potential of the free radical and the reduction potential of the iodonium salt is greater than zero. Alternately, the free radical initiator may generate primary free radicals which, although not capable of reducing the iodonium salt, can in turn generate secondary free radicals which have an oxidation potential sufficient to reduce the iodonium salt. Typically the free radical initiator has good solubility in the silanol without the need for solvents.

Suitable free radical initiators may include phenacyl-based (Ar—(C=O)—R) Norrish Type I photoinitiators, such as 2,2-dimethoxy-2-phenyl acetophenone (available as BASF Irgacure™ 651) and 1-hydroxycyclohexyl phenyl ketone (available as BASF Irgacure™ 184). Suitable free radical initiators may include aliphatic or aromatic ketones that undergo hydrogen abstraction in the excited triplet (T1) state. Suitable free radical initiators may include monoacylphosphine oxides or bisacylphosphine oxides such as Irgacure™ 819 (BASF), monoacyltrialkylgermanium compounds such as benzoyltrimethylgermanium or bisacylbisalkylgermanium compounds such as dibenzoyldiethylgermanium, or isopropylthioxanthone (ITX). Suitable free radical initiators may include benzophenones. In particular, benzophenones with asymmetric linear or branched alkyl substituents may be highly soluble in higher molecular weight silanol fluids.

Suitable thermal free radical initiators may include azo (—N=N—) containing thermal initiators, such as 2,2'-azobis(2-methylbutyronitrile) (Chemours Vazo™ 67), 2,2'-azobis(2,4-dimethylvaleronitrile) (Chemours Vazo™ 52), 2,2'-azobis(4-methoxy-2.4-dimethyl valeronitrile) (Wako V-70™).

Any suitable iodonium salt may be used in the practice of the present disclosure. Typically the iodonium salt has good solubility in the silanol without the need for solvents. Suitable iodonium salts may include diaryliodonium salts. In some embodiments, the iodonium salt comprises one or more C1-C20 linear or branched alkyl chain substituents. In some embodiments, the iodonium salt cation may be according to the formula $(R\text{-}Ph\text{-})_2I^+$, wherein each R is independently selected from C1-C20 linear or branched alkyl chain substituents. The iodonium salt may have any suitable counter ion. Typically the counter ion has low nucleophilicity such that the Brönsted acid that is generated will have a pKa of less than zero. In some embodiments, the counter ion is the conjugate base of a super acid. In some embodiments, the counter ion is selected from hexafluoroantimonate ($SbF_6^-$), hexafluorophosphate ($PF_6^-$, or triflate ($CF_3SO_3^-$); and in particular triflate ($CF_3SO_3^-$).

Any suitable alkoxysilane may be used in the practice of the present disclosure. Suitable alkoxysilanes may contain one trialkoxysilane group or may contain two or more trialkoxysilane groups. Suitable alkoxysilanes may be according to the formula $((R^1O)_3\text{—Si})_n\text{—}R^2$; where each $R^1$ is independently selected from straight-chain, branched, or cyclic alkyl groups comprising 1-8 carbons, such as methyl, ethyl, propyl, butyl, and the like; wherein n is 1, 2, or more; and wherein $R^2$ is any suitable center moiety, such as may be selected from straight-chain, branched, or cyclic alkyl moieties, aromatic moieties, or oligomeric moieties. Examples of suitable alkoxysilanes include 1,8-bis(triethoxysilyl) octane, isooctyltriethoxysilane, and phenyltriethoxysilane. Suitable alkoxysilanes may include those sold under the tradename DOWSIL™ by Dow, Midland, MI; or alkoxysilanes available from Gelest Inc., Morrisville, PA In some embodiments where one or more alkoxysilanes are used, they may comprise 0.01-20 weight percent of the curable composition, 0.01-10 weight percent, 0.01-5.0 weight percent, 0.01-1.0 weight percent, 0.1-20 weight percent, 0.1-10 weight percent, 0.1-5.0 weight percent, or 0.1-1.0 weight percent of the curable composition.

Any suitable MQ silicone resin may be used in the practice of the present disclosure. An MQ resin is a silicone polymeric resin principally comprised of M structural units (i.e., monovalent $R_3SiO_{1/2}$ units) and Q structural units (i.e., tetravalent $SiO_{4/2}$ units), where a "half-oxygen" represents an oxygen shared with an adjacent unit as it forms the bond to that adjacent unit, where each R is independently selected from small substituents, typically selected from hydrogen, hydroxyl, halogens, straight-chain, branched, or cyclic alkyl groups comprising 1-8 carbons, straight-chain, branched, or cyclic alkoxy groups comprising 1-8 carbons, aromatic groups comprising 1-8 carbons, aryloxy groups comprising 1-8 carbons; more typically selected from phenyl or methyl; and most typically methyl. MQ resins are copolymeric resins where M units are covalently bonded to Q units and Q units are covalently bonded to M units or other Q units. MQ resins may optionally include minor amounts of D structural units (i.e., divalent $R'_2SiO_{2/2}$ units), T structural units (i.e., trivalent $R'SiO_{3/2}$ units), or "$T^{OH}$" structural units (i.e., Q units bonded to hydroxyl radicals resulting in $HOSiO_{3/2}$ units). In some embodiments the MQ resins contain only M and Q units. In some embodiments the MQ resins contain only M, Q, and $T^{OH}$ units. In some embodiments the MQ resins contain only M, Q, and D units. Typically MQ resins have a number average molecular weight in the range of 100 to 50,000 gm/mole, e.g., 500 to 15,000 gm/mole. In some embodiments the MQ resins contain hydroxyl groups. In some embodiments the MQ resins contain 0.1-5.0 weight percent hydroxyl groups, 0.1-3.0 weight percent hydroxyl groups, 1.0-5.0 weight percent hydroxyl groups, 1.0-3.0 weight percent hydroxyl groups, 1.5-5.0 weight percent hydroxyl groups, or 1.5-3.0 weight percent hydroxyl groups. Suitable MQ resins may include those sold under the tradename BELSIL® by Wacker Chemie AG., Munich, GE; SR1000 by Momentive Performance Materials Inc., Waterford, NY; DOWSIL™ by Dow, Midland, MI; SR-545, MQ resin in toluene, available from Momentive Inc., Columbus, OH; MQOH resins which are MQ silicate resins in toluene, available from PCR Inc., Gainesville, FL; MQR-32-1, MQR-32-2, and MQR-32-3 resins which are MQD resin in toluene, available from Shin-Etsu Chemical Co. Ltd., Torrance, CA; and PC-403, hydride functional MQ resin in toluene available from Rhone-Poulenc, Latex and Specialty Polymers, Rock Hill, SC Resins supplied in organic solvent may be dried by any number of techniques known in the art, such as spray drying, oven drying, steam drying, etc. to provide an MQ resin containing essentially no amount of common solvents for use in compositions of the present invention. Also useful in compositions of the present invention are blends of two or more MQ resins. In some embodiments where one or more MQ resins are used, they may comprise 1.0-90 weight percent of the curable composition, 1.0-80 weight percent, 1.0-70 weight percent, 1.0-60 weight percent, 1.0-50 weight percent, 1.0-40 weight percent, 5.0-90 weight percent, 5.0-80 weight percent, 5.0-70 weight percent, 5.0-60 weight percent, 5.0-50 weight percent, 5.0-40 weight percent, 10-90 weight percent, 10-80 weight percent, 10-70 weight percent, 1.0-60 weight percent, 10-50 weight percent, 10-40 weight percent, 20-90 weight percent, 20-80 weight percent, 20-70 weight percent, 20-60 weight percent, 20-50 weight percent, or 20-40 weight percent of the curable composition.

Any suitable (meth)acrylate monomers may be used in the practice of the present disclosure. In some embodiments, the (meth)acrylate monomers may include one or more alkyl (meth)acrylates according to the formula $CH_2=CR^1$—$COOR^2$ wherein $R^1$ is —H or —$CH_3$ and $R^2$ is an alkyl group comprising 1-20 carbon atoms. In some embodiments, the (meth)acrylate monomers may include one or more alkyl (meth)acrylates according to the formula $CH_2=CR^1$—$COOR^2$ wherein $R^1$ is —H or —$CH_3$ and $R^2$ is a linear or branched alkyl group comprising 4-12 carbon atoms.

Examples include butyl (meth)acrylate, hexyl (meth)acrylate, 2-ethylhexyl (meth)acrylate, octyl (meth)acrylate, decyl (meth)acrylate, and docecyl (meth)acrylate. In some embodiments, the (meth)acrylate monomers may include one or more alkyl (meth)acrylates according to the formula $CH_2=CR^3-COOR^4$ wherein $R^3$ is —H or —$CH_3$ and $R^4$ is a alicyclic group comprising 5-20 carbon atoms. Examples include isobornyl acrylate. In some embodiments, the (meth)acrylate monomers may include polar or ionic monomers such as (meth)acrylic acid.

In addition, the (meth)acrylate monomers may include one or more multifunctional (meth)acrylate crosslinking monomers comprising two or more (meth)acrylate functional groups. Examples include diol diacrylates such as 1,6-hexanediol diacrylate.

In some embodiments where one or more (meth)acrylate monomers are used, they may comprise 0.1-49 weight percent of the curable composition, 0.1-35 weight percent, 0.1-20 weight percent, 0.1-10 weight percent, 0.1-6.0 weight percent, 0.1-5.0 weight percent, 0.1-4.0 weight percent, 1.0-49 weight percent, 1.0-35 weight percent, 1.0-20 weight percent, 1.0-10 weight percent, 1.0-6.0 weight percent, 1.0-5.0 weight percent, 1.0-4.0 weight percent, 2.0-49 weight percent, 2.0-35 weight percent, 2.0-20 weight percent, 2.0-10 weight percent, 2.0-6.0 weight percent, 2.0-5.0 weight percent, 2.0-4.0 weight percent, 3.0-49 weight percent, 3.0-35 weight percent, 3.0-20 weight percent, 3.0-10 weight percent, 3.0-6.0 weight percent, 3.0-5.0 weight percent, or 3.0-4.0 weight percent of the curable composition.

Curable compositions according to the present disclosure may be made by any suitable method. Typically the components are mixed. In some embodiments where the curable composition comprises (meth)acrylate monomers, the (meth)acrylate monomers may solvate other components, in particular MQ resin if present. Optionally, the MQ resin may be pre-dissolved in the (meth)acrylic monomers to make a low viscosity mixture before the silicones are added to facilitate the ease of mixing. Unlike common solvents, the (meth)acrylate monomers are reactants and do not create VOC emissions after processing.

Curable compositions according to the present disclosure may be cured by any suitable method, in keeping with the type of free radical initiator used, including application of actinic radiation, heat, or both, either simultaneously or sequentially. The type of actinic radiation may be chosen in keeping with the type of free radical initiator used and may include ultraviolet (UV) radiation, such as UV A or UV B, blue light, white light, infrared radiation, or combinations of the above. The curable combinations may be shaped in any suitable manner prior to cure, including formation of films, beads, or threads or application to one or more substrates or adherends.

Cured compositions according to the present disclosure may be obtained by cure of the curable compositions of the present disclosure. The cured compositions are typically solids at NTP. The cured compositions may contain essentially no amount of common solvents. Such compositions may comprise a cured silicone; a free radical initiator or residue thereof; and an iodonium salt or residue thereof; optionally a poly(meth)acrylate, and optionally an MQ resin which may comprise a part or all of the cured silicone. In some embodiments where one or more alkoxysilanes are used, they may comprise 0.01-20 weight percent of the cured composition, 0.01-10 weight percent, 0.01-5.0 weight percent, 0.01-1.0 weight percent, 0.1-20 weight percent, 0.1-10 weight percent, 0.1-5.0 weight percent, or 0.1-1.0 weight percent of the cured composition. In some embodiments where one or more MQ resins are used, they may comprise 1.0-90 weight percent of the cured composition, 1.0-80 weight percent, 1.0-70 weight percent, 1.0-60 weight percent, 1.0-50 weight percent, 1.0-40 weight percent, 5.0-90 weight percent, 5.0-80 weight percent, 5.0-70 weight percent, 5.0-60 weight percent, 5.0-50 weight percent, 5.0-40 weight percent, 10-90 weight percent, 10-80 weight percent, 10-70 weight percent, 1.0-60 weight percent, 10-50 weight percent, 10-40 weight percent, 20-90 weight percent, 20-80 weight percent, 20-70 weight percent, 20-60 weight percent, 20-50 weight percent, or 20-40 weight percent of the cured composition.

Cured silicones comprising acrylate materials according to the present disclosure may be obtained by cure of curable compositions of the present disclosure that comprise (meth)acrylate monomers. Such materials may comprise a continuous phase of principally silicone material and a discontinuous phase of principally acrylate material, such as the unusual structure depicted in the electron micrographs of FIGS. 1 & 2, which comprises a continuous phase of principally silicone material and a discontinuous phase of principally acrylate material on a sub-micrometer scale. The poly(meth)acrylate inclusions which make up the discontinuous phase of poly(meth)acrylate may have an average diameter of less than 1.0 micrometer, less than 0.9 micrometer, less than 0.8 micrometer, less than 0.7 micrometer, less than 0.6 micrometer, or less than 0.5 micrometer. In some embodiments comprising poly(meth)acrylate inclusions, they may comprise 0.1-49 weight percent of the cured composition, 0.1-35 weight percent, 0.1-20 weight percent, 0.1-10 weight percent, 0.1-6.0 weight percent, 0.1-5.0 weight percent, 0.1-4.0 weight percent, 1.0-49 weight percent, 1.0-35 weight percent, 1.0-20 weight percent, 1.0-10 weight percent, 1.0-6.0 weight percent, 1.0-5.0 weight percent, 1.0-4.0 weight percent, 2.0-49 weight percent, 2.0-35 weight percent, 2.0-20 weight percent, 2.0-10 weight percent, 2.0-6.0 weight percent, 2.0-5.0 weight percent, 2.0-4.0 weight percent, 3.0-49 weight percent, 3.0-35 weight percent, 3.0-20 weight percent, 3.0-10 weight percent, 3.0-6.0 weight percent, 3.0-5.0 weight percent, or 3.0-4.0 weight percent of the cured composition.

In some embodiments, the cured compositions may be pressure sensitive adhesives (PSA's). In some embodiments, the cured compositions may be non-adhesive. Cured compositions according to the present disclosure may be useful and may present superior performance in applications where silicones are commonly used. Cured compositions according to the present disclosure may be useful in applications such as PSA's, gaskets, cushions, thermal pads, coatings, sealants, or release coatings.

Additional embodiments are recited in the Selected Embodiments and Examples below.

Selected Embodiments

The following embodiments, designated by letter and number, are intended to further illustrate the present disclosure but should not be construed to unduly limit this disclosure.

CC1. A curable composition comprising a mixture of:
   a) a silanol;
   b) a free radical initiator; and
   c) an iodonium salt.

CC2. The curable composition according to embodiment CC1 additionally comprising:
   d) an alkoxysilane.

CC3. The curable composition according to embodiment CC2 wherein the alkoxysilane comprises one or more trialkoxysilane groups.

CC4. The curable composition according to any of embodiments CC2 wherein the alkoxysilane comprises two or more trialkoxysilane groups.

CC5. The curable composition according to any of embodiments CC1-CC4 wherein the silanol is a polysiloxane comprising silanol groups.

CC6. The curable composition according to any of embodiments CC1-CC4 wherein the silanol is a silanol-terminated polysiloxane.

CC7. The curable composition according to any of embodiments CC1-CC4 wherein the silanol is a silanol-terminated polydialkylsiloxane.

CC8. The curable composition according to any of embodiments CC1-CC4 wherein the silanol is a silanol-terminated polydimethylsiloxane CC9. The curable composition according to any of embodiments CC1-CC8 wherein the free radical initiator is a photoinitiator.

CC10. The curable composition according to any of embodiments CC1-CC8 wherein the free radical initiator is a thermal free-radical initiator or thermal polymerization initiator.

CC11. The curable composition according to any of embodiments CC1-CC10 wherein the free radical initiator generates free radicals having an oxidation potential sufficient to reduce the iodonium salt.

CC12. The curable composition according to any of embodiments CC1-CC11 wherein the iodonium salt comprises a C1-C20 linear or branched alkyl chain substituent.

CC13. The curable composition according to any of embodiments CC1-CC12 wherein the iodonium salt comprises a triflate counter ion.

CC14. The curable composition according to any of embodiments CC1-CC13 additionally comprising:
  e) an MQ resin.

CC15. The curable composition according to any of embodiments CC1-CC14 additionally comprising:
  f) one or more (meth)acrylate monomers.

CC16. The curable composition according to embodiment CC15 wherein the one or more (meth)acrylate monomers include one or more alkyl (meth)acrylates according to the formula $CH_2=CR^1-COOR^2$ wherein $R^1$ is —H or —$CH_3$ and $R^2$ is an alkyl group comprising 1-20 carbon atoms.

CC17. The curable composition according to embodiment CC15 wherein the one or more (meth)acrylate monomers include one or more alkyl (meth)acrylates according to the formula $CH_2=CR^1-COOR^2$ wherein $R^1$ is —H or —$CH_3$ and $R^2$ is a linear or branched alkyl group comprising 4-12 carbon atoms.

CC18. The curable composition according to any of embodiments CC15-CC17 wherein the one or more (meth)acrylate monomers include one or more alkyl (meth)acrylates according to the formula $CH_2=CR^3-COOR^4$ wherein $R^3$ is —H or —$CH_3$ and $R^4$ is a alicyclic group comprising 5-20 carbon atoms.

CC19. The curable composition according to any of embodiments CC15-CC18 wherein the one or more (meth)acrylate monomers include (meth)acrylic acid.

CC20. The curable composition according to any of embodiments CC1-CC19 additionally comprising:
  g) one or more multifunctional (meth)acrylate crosslinking monomers comprising two or more (meth)acrylate functional groups.

CC21. The curable composition according to any of embodiments CC1-CC20 wherein the mixture comprises essentially no amount of species comprising a curable epoxide group.

CC22. The curable composition according to any of embodiments CC1-CC21 comprising essentially no amount of common solvents.

M1. A method of making a silicone-containing composition comprising:
  a) providing a curable composition according to any of embodiments CC1-CC22; and
  b) curing the curable composition to make a cured composition.

M2. The method according to embodiment M1 wherein curing comprises application of heat to the curable composition.

M3. The method according to embodiment M1 wherein curing comprises application of actinic radiation to the curable composition.

M4. The method according to embodiment M1 wherein curing comprises application of ultraviolet radiation to the curable composition.

M5. A cured composition obtained by any of the methods of embodiments M1-M4.

CA1. A composition comprising
  a) a cured silicone;
  b) a free radical initiator or residue thereof; and
  c) an iodonium salt or residue thereof.

CA2. The composition according to embodiment CA1 wherein the composition is a solid at NTP.

CA3. The composition according to any of embodiments CA1-CA2 additionally comprising:
  d) a poly(meth)acrylate.

CA4. The composition according to any of embodiments CA1-CA3 additionally comprising:
  e) an MQ resin.

CA5. The composition according to any of embodiments CA1-CA4 which is a pressure sensitive adhesive (PSA).

CA6. The composition according to any of embodiments CA1-CA4 comprising essentially no amount of common solvents.

CB1. A composition comprising:
  a) a continuous phase of cured silicone; and
  b) a discontinuous phase of poly(meth)acrylate inclusions.

CB2. The composition according to embodiment CB1 wherein the composition is a solid at NTP.

CB3. The composition according to any of embodiments CB1-CB2 wherein the poly(meth)acrylate inclusions have an average diameter of less than 1.0 micrometer.

CB4. The composition according to any of embodiments CB1-CB2 wherein the poly(meth)acrylate inclusions have an average diameter of less than 0.9 micrometer.

CB5. The composition according to any of embodiments CB1-CB2 wherein the poly(meth)acrylate inclusions have an average diameter of less than 0.8 micrometer.

CB6. The composition according to any of embodiments C1-C2 wherein the poly(meth)acrylate inclusions have an average diameter of less than 0.7 micrometer.

CB7. The composition according to any of embodiments CB1-CB2 wherein the poly(meth)acrylate inclusions have an average diameter of less than 0.6 micrometer.

CB8. The composition according to any of embodiments CB1-CB2 wherein the poly(meth)acrylate inclusions have an average diameter of less than 0.5 micrometer.

CB9. The composition according to any of embodiments CB1-CB8 additionally comprising:
  c) an MQ resin.

CB10. The composition according to any of embodiments CB1-CB9 which is a pressure sensitive adhesive (PSA).
CB11. The composition according to any of embodiments CB1-CB10 comprising essentially no amount of common solvents.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, WI, or may be synthesized by known methods.

All parts, percentages, ratios, etc. in the examples and the rest of the specification are by weight, unless noted otherwise. The following abbreviations may be used: m=meters; cm=centimeters; mm=millimeters; um=micrometers; ft=feet; in=inch; RPM=revolutions per minute; kg=kilograms; oz=ounces; lb=pounds; Pa=Pascals; sec=seconds; min=minutes; hr=hours; fpm=feet per minute; dm=decimeter; mL=milliliters; g=grams; and RH=relative humidity. The terms "weight %", "% by weight", and "wt %" are used interchangeably.

Materials

Preparation of PI 2

To a 12 L, 4 neck flask equipped with a mechanical stirrer, water condenser and N2 cap, thermometer, and glass stopped was charged 7664 grams of solution of 17.2 wt % bis(dodecylphenyl)iodonium bisulfate in cyclohexane. 608.8 g of a 50 wt % trifluoromethanesulfonic acid in water solution was added via an addition funnel producing a minor exotherm and changing the color of the reaction from amber to orange. This solution was stirred at room temperature for 3 hours, at which time stirring was stopped and the solution was allowed to phase split. An aliquot of the organic layer was washed with water and neutralized with sodium bicarbonate before being analyzed via NMR to be 76% reacted. An additional 220 g 50 wt % trifluoromethanesulfonic acid solution was added and the reaction was stirred at room temperature for a total of 24 hours at which time NMR analysis of an organic aliquot was determined to be 86% converted. The lower aqueous phase was separated and discarded followed by addition to the organic phase of 1965 g of 8.28 wt % solution of sodium bicarbonate solution in water which was allowed to stir for 30 minutes. The pH of the aqueous phase was 8. The organic phase was washed with 1845 g water and then another 1846 g water and pH was tested again to be 6-7. The organic phase was passed through a 25 micrometer filter and then cyclohexane was removed in vacuo. 930.1 g of 1,8-bis-(triethoxysilyl)octane was added,

| Identification | Product Name | Description | Obtained from |
| --- | --- | --- | --- |
| Silanol 1 | Xiameter OHX-4000 | silanol terminated polydimethylsiloxane, viscosity 2,000 cp. | Dow, Midland, MI |
| Silanol 2 | Xiameter OHX-4050 | silanol terminated polydimethylsiloxane, viscosity 16,500 cp. | Dow, Midland, MI |
| Silanol 3 | Xiameter PMX-0156 | silanol terminated polydimethylsiloxane, viscosity 50-120 cp. | Dow, Midland, MI |
| 2-EHA | 2-ethylhexyl acrylate | 2-ethylhexyl acrylate | BASF Corporation, Florham Park, NJ |
| IBOA | Isobornyl Acrylate | Isobornyl Acrylate | BASF Corporation, Florham Park, NJ |
| AA | Acrylic acid | Acrylic acid | BASF Corporation, Florham Park, NJ |
| HDDA | 1,6-Hexanediol diacrylate | 1,6-Hexanediol diacrylate | Allnex, Alpharetta, GA |
| XL 1 | SIB-1824 | 1,8-bis(triethoxysilyl) octane | Gelest Inc., Morrisville, PA |
| XL 2 | SII6457.5 | Isooctyltriethoxysilane | Gelest Inc., Morrisville, PA |
| XL 3 | SIP6821.0 | Phenyltriethoxysilane | Gelest Inc., Morrisville, PA |
| PI 1 | Irgacure 184 | 1-hydroxycyclohexyl phenyl ketone | BASF Corporation, Florham Park, NJ |
| PI 2 | Triflate PAG | Bis(4-dodecylphenyl) iodonium triflate at 61% in 1,8-bis(triethoxysilyl) octane | (see procedure) |
| MQ Resin 1 | SR1000 | silicone MQ resin (trimethylsiloxysilicate) powder | Momentive Performance Materials Inc., Waterford, NY |
| MQ Resin 2 | MQ-1600 | silicone MQ resin (trimethylsiloxysilicate) flake | Dow, Midland, MI |
| MQ Resin 3 | BELSIL ® TMS 803 | Silicone MQ resin (trimethylsiloxysilicate) powder | Wacker Chemie AG., Munich, GE |
| PET 1 | HOSTAPHAN 3SAB | 200 gauge (50 micrometers) single side treated PET film | Mitsubishi Polyester Film Inc., Greer, SC |
| PET 2 | PRIMELINER 5199 | 2 mil PET fluoro-silicone single side treated release liner | Loparex, Cary NC |
| PET 3 | HOSTAPHAN 3SAC | 300 gauge (75 micrometers) treated PET film | Mitsubishi Polyester Film Inc., Greer, SC |
| PET 4 | HOSTOPHAN 22MKN | 2 mil PET Release Liner | Mitsubishi Polyester Film Inc., Greer, SC | resulting in 2507.8 g of 62.9% bis(dodecylphenyl)iodonium triflate in 1,8-bis-(triethoxysilyl)octane.

List of Equipment

UV Source 1: Sylvania 350 black light F8T5/350BL 8 Watts. The Sylvania F8T5/350BL bulbs were arranged in a bank of 6 parallel bulbs with a spacing of 2.54 centimeters (1 inch) center to center. Samples were exposed to this UV source within a nitrogen purged box. Lamps obtained from LEDVANCE Wilmington, MA.

UV Source 2: Fusion H Bulb. Fusion H bulb used in a Fusion model HP6 high powered 6 inch UV lamp system with a VPS-3 power supply and secured to a Fusion model LC-6B variable power conveyor system. Obtained from Heraeus Noblelight Fusion UV Inc, Gaithersburg, MD Samples were exposed to this UV source at 20 fpm in air.

Thermal Batch Oven: Despatch V Series thermal batch oven obtained from Despatch Industries Minneapolis, MN.

8-Path Wet Film Applicator Item #15: A manual laboratory gap coater used to apply a coating with a specific gap at a width of 10.16 centimeters (4 inches). Obtained from GARDCO Paul N Gardner Company of Pompano Beach, FL.

Test Methods

Gel Content of Polymer

The extent of crosslinking was determined by measuring the amount of gel in the polymerized sample after swelling and extracting the non-gelled content from the sample with toluene. The polymerized sample was cut into 25 mm×25 mm squares. A sample was placed inside a 35 mm×35 mm basket formed from 64 mesh stainless steel. The initial weight of the basket was determined with and without the sample. The basket with the sample was placed in a pint size glass jar. The jar with the basket and sample was filled with toluene to cover the sample. The sample was soaked in toluene for 24 hours at room temperature, 21° C. The basket with what remained of the sample in the basket was then removed from the toluene and dried at 121° C. for 30 minutes. The dried basket and sample was weighed. The weight of the non-soluble PET backing was also determined. The gel % was calculated as:

gel %=100%×((weight of dried basket with sample after extraction)−(initial weight of basket)−(weight of PET backing))/((initial weight of basket with initial sample)−(weight of PET backing))

Peel Adhesion to Stainless Steel

A peel adhesion force was measured in accordance to ASTM D3330/D3330M—04 (2010) Test Method E—Adhesion of Adhesive Transfer Tapes 15.1 Face Side using an IMASS SP 2100 peel force tester with a 10 lb load cell and set to 12 inches per minute with a 2 second delay and 10 second averaging time. The peel force was measured on a 25.4 mm wide test specimen. The average peel force was measured in oz/in and converted to N/dm. The peel adhesion force of the tape specimen to a stainless steel (SS) panel was measured after a dwell of 72 hours on the SS panel at 21° C. and 50% relative humidity conditions. The data reported is an average of two measurements.

Peel Adhesion to Silicone Rubber

The peel adhesion to silicone rubber was measured in the same way as peel adhesion to stainless steel except the SS panel was replaced by a panel cut from a sheet of silicone rubber, which was product number DSP6038GP-062 obtained from Diversified Silicone Products of Santa Fe Springs, CA Shear Adhesion to Stainless Steel The shear adhesion to stainless steel (SS) was measured in accordance to ASTM D3654/D3654M-06 (2011) procedure A (room temperature or RT) or H (high temperature or HT). For procedure A and H the sample area was 25.4 mm×25.4 mm and the load was 500 g. The temperature used for procedure H was 70° C. The time to failure was measured in minutes for each test specimen and reported as an average of two tests. In addition, the failure mode is reported as "cohesive" when substantial residue was left on the panel or "clean" when no substantial adhesive residue was left on the panel.

Transmission, Haze, and Clarity

Transmission, Haze, and Clarity (THC) measurements were performed using a BYK-Chemie (Wesel, Germany) Hazegard i. The face side (elastomer-bearing side) of the polymerized sample on PET 1 was laminated with the release treated side of PET 2 and cut to approximately 5 cm wide by 10 cm long. The PET 2 was removed from the face side of the cut sample. The face side of the cut sample was then laminated to an optically clear 0.51 micrometer (2 mil) thick polyethylene terephthalate film (PET, Skyrol SH-81 from SKC Haas, Korea) and placed in the Hazegard i to measure THC. Some samples were then aged in an oven chamber set to 65° C. and 90% relative humidity for ≥1000 hours. Samples were removed from the heat and humidity chamber and allowed to equilibrate to CTH conditions (23° C. and 50% relative humidity) for ≥1 hour, prior to any further measurements. THC of the aged samples were then measured and compared to the measured THC of the non-aged samples.

Transmission Electron Microscope

Figure 2:
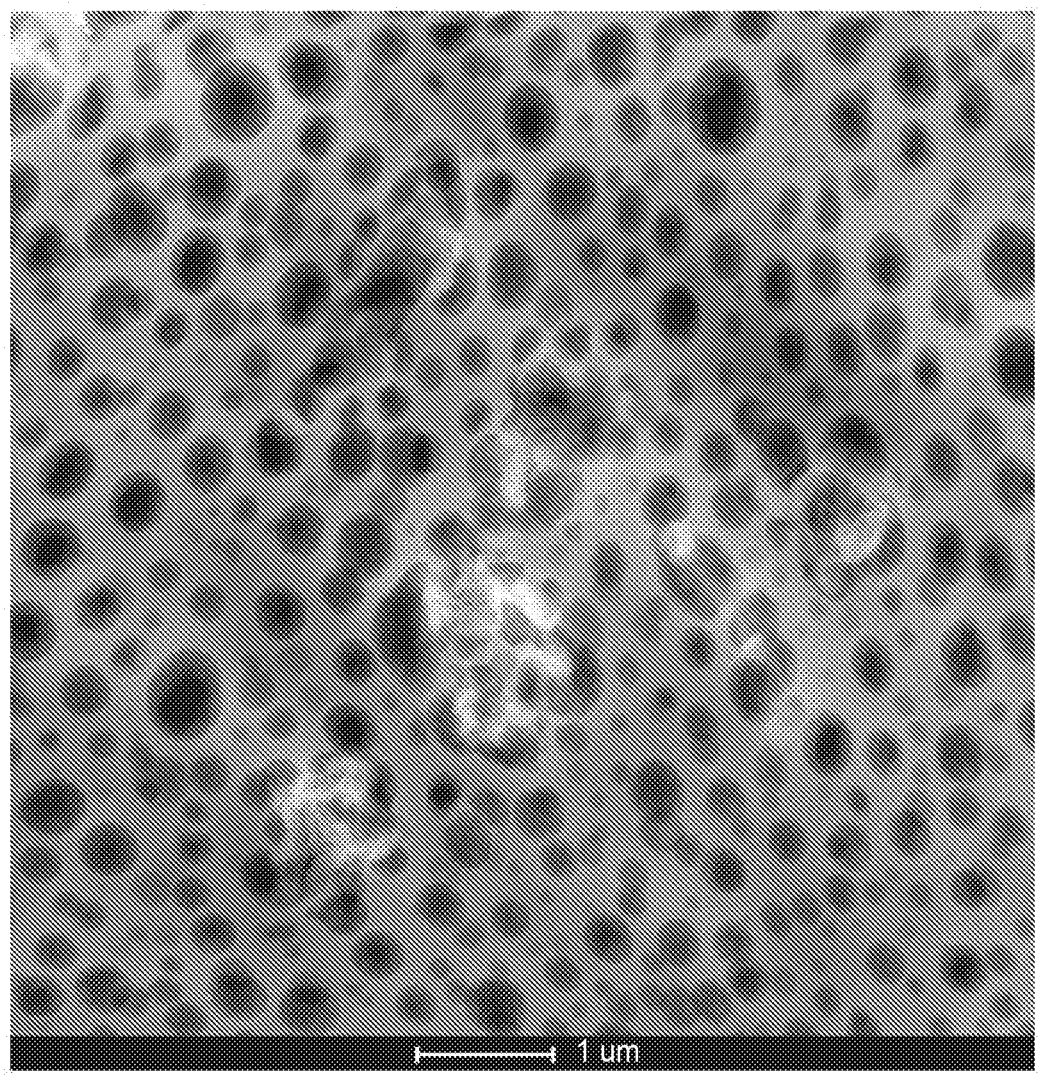
FIG. 2 is a High Angle Annular Dark Field Scanning Transmission Electron Microscopy image of a thin section of a silicone elastomer according to one embodiment of the present disclosure taken at a magnification of 14,000×, as described in the Examples section herein.

Samples of the cured material of Example 17 were prepared for scanning transmission electron microscopy (STEM) by dry cutting at cryo temperatures between −100° C. and −130° C. The thin sections were brought back to room-temperature under a gentle flow of dry nitrogen gas. Two STEM imaging modes were used: Bright Field (BF) and High Angle Annular Dark Field (HAADF). FIG. 1 is a BF STEM image taken at a magnification of 14,000×. FIG. 2 is an HAADF STEM image taken at a magnification of 14,000×. In both figures, a scale bar represents 1 micrometer.

Thermal Gravimetric Analysis (TGA)

The specimens were prepared for TGA by loading the materials directly into high-temperature platinum TGA sample pans. The samples were analyzed using the TA Instruments Discovery Thermogravimetric Analyzer in standard mode. Each sample was run once. Each sample was subjected to a heating profile extending from 35° C. to 700° C. in an air atmosphere, with a linear heating rate of 20.0° C./min and a resolution setting of 5.0. Under these conditions, the instrument heats the sample until weight loss is detected, at which point the temperature stabilizes until weight loss diminishes, and then heating recommences.

Examples

Intermediate Mixtures A-Y:

The materials recited in Table 1 were measured into glass vials or jars followed by hand mixing to make the various intermediate mixtures of acrylic monomers, MQ silicone resins, and/or siloxanes and other components. The intermediate mixtures that contain MQ silicone resins were made by adding the MQ resins first to the siloxane(s) and/or acrylic monomer(s), followed by hand mixing and sufficient time to dissolve the MQ resin before the remaining materials were added. The intermediate mixtures ranged from clear to hazy in appearance, as noted in Table 1, and were all observed to be stable as determined by no visible separation within 24 hours after complete dissolution and mixing. Entries in Table 1 for each component indicate the weight percent of that component in the intermediate mixture.

TABLE 1

Intermediate Mixtures A-Y

| Intermediate Mixture ID | Silanol 1 | Silanol 2 | Silanol 3 | MQ Resin 1 | MQ Resin 2 | MQ Resin 3 | PI 1 | PI 2 | XL1 | XL2 | XL3 | 2EHA | IBOA | AA | HDDA | Solution Mixture Observations |
|---|---|---|---|---|---|---|---|---|---|---|---|---|---|---|---|---|
| A | 0 | 0 | 0 | 0 | 0 | 0 | 0.35 | 0 | 0 | 0 | 0 | 99.29 | 0 | 0 | 0.36 | Clear |
| B | 0 | 0 | 0 | 0 | 0 | 0 | 0.35 | 0 | 0 | 0 | 0 | 99.03 | 0 | 0 | 0.62 | Clear |
| C | 0 | 0 | 0 | 0 | 0 | 0 | 0.35 | 0 | 0 | 0 | 0 | 94.38 | 0 | 4.97 | 0.30 | Clear |
| D | 0 | 0 | 0 | 0 | 0 | 0 | 0.36 | 0 | 0 | 0 | 0 | 85.06 | 14.29 | 0 | 0.28 | Clear |
| E | 98.03 | 0 | 0 | 0 | 0 | 0 | 0 | 1.22 | 0.75 | 0 | 0 | 0 | 0 | 0 | 0 | Hazy |
| F | 98.91 | 0 | 0 | 0 | 0 | 0 | 0.36 | 0 | 0.73 | 0 | 0 | 0 | 0 | 0 | 0 | Hazy |
| G | 97.64 | 0 | 0 | 0 | 0 | 0 | 0.36 | 1.24 | 0.76 | 0 | 0 | 0 | 0 | 0 | 0 | Hazy |
| H | 97.14 | 0 | 0 | 0 | 0 | 0 | 0.49 | 1.47 | 0.90 | 0 | 0 | 0 | 0 | 0 | 0 | Hazy |
| I | 68.63 | 0 | 0 | 29.41 | 0 | 0 | 0.35 | 1.00 | 0.60 | 0 | 0 | 0 | 0 | 0 | 0 | Hazy |
| J | 48.97 | 0 | 0 | 48.97 | 0 | 0 | 0.35 | 1.06 | 0.65 | 0 | 0 | 0 | 0 | 0 | 0 | Hazy |
| K | 53.93 | 0 | 0 | 44.12 | 0 | 0 | 0.35 | 1.00 | 0.60 | 0 | 0 | 0 | 0 | 0 | 0 | Clear |
| L | 24.48 | 24.48 | 0 | 48.97 | 0 | 0 | 0.35 | 1.06 | 0.65 | 0 | 0 | 0 | 0 | 0 | 0 | Clear |
| M | 22.03 | 22.03 | 9.79 | 44.07 | 0 | 0 | 0.35 | 1.06 | 0.65 | 0 | 0 | 0 | 0 | 0 | 0 | Hazy |
| N | 0 | 0 | 0 | 0 | 0 | 0 | 15.05 | 52.67 | 32.28 | 0 | 0 | 0 | 0 | 0 | 0 | Clear |
| O | 0 | 0 | 0 | 48.98 | 0 | 0 | 0.31 | 1.08 | 0.66 | 0 | 0 | 41.37 | 7.30 | 0 | 0.31 | Clear |
| P | 35.91 | 0 | 0 | 0 | 40 | 0 | 0 | 0 | 0 | 0 | 0 | 20.35 | 3.59 | 0 | 0.15 | Clear |
| Q | 48.85 | 0 | 0 | 0 | 0 | 48.85 | 0.35 | 1.21 | 0.74 | 0 | 0 | 0 | 0 | 0 | 0 | Clear |
| R | 0 | 0 | 0 | 0 | 0 | 48.87 | 0.35 | 1.21 | 0.74 | 0 | 0 | 41.24 | 7.28 | 0 | 0.31 | Clear |
| S | 0 | 0 | 0 | 0 | 80 | 0 | 0 | 0 | 0 | 0 | 0 | 16.89 | 2.98 | 0 | 0.13 | Clear |
| T | 0 | 0 | 0 | 49.85 | 0 | 0 | 0 | 0 | 0 | 0 | 0 | 42.32 | 7.48 | 0 | 0.30 | Clear |
| U | 50 | 0 | 0 | 50 | 0 | 0 | 0 | 0 | 0 | 0 | 0 | 0 | 0 | 0 | 0 | Clear |
| V | 0 | 0 | 0 | 0 | 0 | 0 | 5.01 | 14.22 | 0 | 10.55 | 0 | 59.30 | 10.47 | 0 | 0.45 | Clear Amber |
| W | 0 | 0 | 0 | 0 | 0 | 0 | 4.99 | 14.19 | 0 | 0 | 10.79 | 59.15 | 10.44 | 0 | 0.45 | Clear Amber |
| X | 0 | 0 | 0 | 0 | 0 | 0 | 5.91 | 16.85 | 5.16 | 0 | 15.49 | 47.59 | 8.59 | 0 | 0.42 | Clear Amber |
| Y | 0 | 0 | 0 | 0 | 0 | 0 | 7.49 | 21.34 | 0 | 0 | 0 | 60.29 | 10.88 | 0 | 0 | Clear Amber |

It was found that the MQ resins were highly soluble in the acrylic monomers, making the acrylic useful both as a co-reactant and a solvent to wet and pre-dissolve the MQ resin. Intermediate Mixture S demonstrates that a combination of as much as 80 weight percent MQ resin in acrylate monomers remained a clear, pourable solution, which had a honey-like viscosity. It was further found that acrylate monomers and silanols were soluble in one another in the ranges demonstrated. The acrylate monomers again acted as solvents to reduce the overall viscosity of the highly viscous silanols, resulting in a workable mixture without the use of common solvents.

Examples 1-34 (Ex. 1-Ex. 34) and Comparative Examples 1-3 (CE1-CE3)

The intermediate mixtures or combinations of two or three intermediate mixtures were then further portioned and/or combined into clear glass vials in the amounts shown in Table 2 and mixed by hand to form coatable curable mixtures. The curable mixtures ranged from clear to hazy in appearance, noted in Table 2, and were all observed to be stable as determined by no visible separation within 4 hours after mixing.

TABLE 2

Composition of the Curable Mixtures of the Examples

| Example | 1st Inter. Mixture ID | 2nd Inter. Mixture ID | 3rd Inter. Mixture ID | 1st Inter. Mixture (grams) | 2nd Inter. Mixture (grams) | 3rd Inter. Mixture (grams) |
|---|---|---|---|---|---|---|
| CE 1 | E | none | none | 10 | 0 | 0 |
| CE 2 | F | none | none | 10 | 0 | 0 |
| CE 3 | A | none | none | 10 | 0 | 0 |
| Ex. 1 | G | none | none | 10 | 0 | 0 |
| Ex. 2 | H | none | none | 10 | 0 | 0 |
| Ex. 3 | L | none | none | 10 | 0 | 0 |
| Ex. 4 | M | none | none | 10 | 0 | 0 |
| Ex. 5 | I | none | none | 10 | 0 | 0 |

TABLE 2-continued

Composition of the Curable Mixtures of the Examples

| Example | 1st Inter. Mixture ID | 2nd Inter. Mixture ID | 3rd Inter. Mixture ID | 1st Inter. Mixture (grams) | 2nd Inter. Mixture (grams) | 3rd Inter. Mixture (grams) |
|---|---|---|---|---|---|---|
| Ex. 6  | K | none | none | 10  | 0    | 0   |
| Ex. 7  | J | none | none | 10  | 0    | 0   |
| Ex. 8  | Q | none | none | 10  | 0    | 0   |
| Ex. 9  | B | H    | none | 4   | 16   | 0   |
| Ex. 10 | B | I    | none | 2   | 8    | 0   |
| Ex. 11 | B | I    | none | 3   | 7    | 0   |
| Ex. 12 | B | L    | none | 0.8 | 8    | 0   |
| Ex. 13 | B | M    | none | 1.3 | 10   | 0   |
| Ex. 14 | C | I    | none | 1   | 9    | 0   |
| Ex. 15 | C | I    | none | 2   | 8    | 0   |
| Ex. 16 | A | K    | none | 2   | 8    | 0   |
| Ex. 17 | A | I    | none | 2   | 8    | 0   |
| Ex. 19 | D | I    | none | 1   | 9    | 0   |
| Ex. 20 | D | I    | none | 2   | 8    | 0   |
| Ex. 21 | D | I    | none | 3   | 7    | 0   |
| Ex. 18 | D | J    | none | 1   | 9    | 0   |
| Ex. 22 | D | J    | none | 1.9 | 8    | 0   |
| Ex. 23 | D | J    | none | 2   | 7    | 0   |
| Ex. 24 | O | J    | none | 1   | 9    | 0   |
| Ex. 25 | O | J    | none | 2   | 8    | 0   |
| Ex. 26 | O | J    | none | 3   | 7    | 0   |
| Ex. 27 | P | N    | none | 15  | 0.3  | 0   |
| Ex. 28 | R | Q    | none | 3   | 7    | 0   |
| Ex. 29 | T | U    | V    | 3.3 | 11.7 | 1.1 |
| Ex. 30 | T | U    | W    | 3.3 | 11.7 | 1.1 |
| Ex. 31 | T | U    | X    | 0.9 | 14.1 | 0.9 |
| Ex. 32 | T | U    | X    | 2.8 | 12.2 | 0.9 |
| Ex. 33 | T | U    | X    | 5.7 | 10.3 | 0.8 |
| Ex. 34 | T | U    | Y    | 5.3 | 10.3 | 1.0 |

Examples 1-4, Examples 9-11, and Comparative Examples 1-2

A sheet of PET 1 was cut to 6 inches×12 inches and taped with the primer side up to a glass plate. An amount of 2-3 milliliters of the curable mixture was spread onto the PET 1 sheet with the 76 micrometer (3 mil) gap of the 8-path applicator to form a curable coating of 10.2 cm×25.4 cm (4 inches×10 inches). The curable coating on PET 1 was then placed directly under the lights of UV Source 1 and cured under a nitrogen purge for 10 minutes followed by 5 min of thermal exposure at 80° C. in the thermal batch oven.

Comparative Example 3

A sheet of PET 1 was cut to 15.2 cm×30.5 cm (6 inches×12 inches) and taped with the primer side up to a glass plate. A frame was created from a sheet of PET 3 cut to 15.2 cm×30.5 cm (6 inches×12 inches) with a hole of 7.6 cm×15.2 cm (3 inches×6 inches) cut into the center. This PET 3 frame was taped onto the PET 1. An amount of 2-3 milliliters of the curable mixture was spread out onto the PET 1 in the center of the PET 3 frame. A sheet of PET 4 cut to 15.2 cm×30.5 cm (6 inches×12 inches) was then placed over the curable mixture, release surface facing the curable mixture, to create a curable coating of 76 micrometer (3 mils) thickness between the PET 1 and the PET 4. This curable coating between PET 1 and PET 4 was placed directly under the lights of UV Source 1 and cured under a nitrogen purge for 15 minutes followed by 5 min of thermal exposure at 65° C. in the thermal batch oven.

Examples 7-8 and Examples 19-28

The procedure used to make Examples 1-4 was used to make Examples 7-8 and Examples 19-28, except the coating was exposed to additional UV from UV source 2 in air at 20 fpm after exposure to UV source 1 under nitrogen purge for 10 minutes and thermal exposure of 5 minutes at 80° C. in the thermal batch oven.

Examples 12-13

The procedure used to make Examples 1-4 was used to make Examples 12-13, except the coating was exposed to UV Source 1 and cured under a nitrogen purge for 15 minutes followed by 5 min of thermal exposure at 80° C. in the thermal batch oven.

Examples 5-6 and Examples 14-17

The procedure used to make Examples 1-4 was used to make Examples 5-6 and Examples 14-17, except the coating was exposed to UV Source 1 and cured under a nitrogen purge for 15 minutes followed by 5 min of thermal exposure at 65° C. in the thermal batch oven.

Examples 29-34

The procedure used to make Examples 1-4 was used to make Examples 29-34, except the coating was exposed to UV Source 1 and cured under a nitrogen purge for 15 minutes followed by 5 min of thermal exposure at 70° C. in the thermal batch oven.

Testing and Results

CE1 and CE2 failed to cure. Examples 1, 2, and 9 cured to a non-tacky film. CE3 and Examples 3-8 and 10-34 cured to a tacky film, i.e., a PSA. Various coated and cured Examples and CE3 were tested for gel content, peel adhesion on stainless steel (SS), peel adhesion on silicon rubber (Si Rubber), shear adhesion on stainless steel at room temperature (RT) and high temperature (HT, 70° C.), and/or transmission, haze, and clarity (THC). Test results are shown in Tables 3-5. "NT" denotes not tested.

TABLE 3

| Ex. ID | Silanol Wt % in cured layer | MQ Resin Wt % in cured layer | Acrylic Wt % in cured layer | Gel % Avg |
|---|---|---|---|---|
| CE 1 | 98.0 | 0.0 | 0.0 | NT |
| CE 2 | 98.9 | 0.0 | 0.0 | NT |
| CE 3 | 0.0 | 0.0 | 99.6 | 95.5 |
| Ex. 1 | 97.6 | 0.0 | 0.0 | 86.6 |
| Ex. 2 | 97.1 | 0.0 | 0.0 | 92.3 |
| Ex. 3 | 49.0 | 49.0 | 0.0 | 51.6 |
| Ex. 4 | 53.9 | 44.1 | 0.0 | 56.8 |
| Ex. 5 | 68.6 | 29.4 | 0.0 | 74.6 |
| Ex. 6 | 53.9 | 44.1 | 0.0 | 72.2 |
| Ex. 7 | 49.0 | 49.0 | 0.0 | 47.7 |
| Ex. 8 | 48.8 | 48.8 | 0.0 | 70.0 |
| Ex. 9 | 77.7 | 0.0 | 19.9 | 88.5 |
| Ex. 10 | 54.9 | 23.5 | 19.9 | 47.9 |
| Ex. 11 | 48.0 | 20.6 | 29.9 | 58.2 |
| Ex. 12 | 44.5 | 44.5 | 9.1 | 58.8 |
| Ex. 13 | 47.7 | 39.0 | 11.5 | 61.6 |
| Ex. 14 | 61.8 | 26.5 | 10.0 | 40.8 |
| Ex. 15 | 54.9 | 23.5 | 19.9 | 57.0 |
| Ex. 16 | 43.1 | 35.3 | 19.9 | 58.5 |
| Ex. 17 | 54.9 | 23.5 | 19.9 | 58.8 |
| Ex. 19 | 61.8 | 26.5 | 10.0 | 57.2 |
| Ex. 20 | 54.9 | 23.5 | 19.9 | 57.4 |
| Ex. 21 | 48.0 | 20.6 | 29.9 | 64.4 |
| Ex. 18 | 44.1 | 44.1 | 10.0 | 33.4 |
| Ex. 22 | 39.6 | 39.6 | 19.1 | 40.3 |
| Ex. 23 | 38.1 | 38.1 | 22.1 | 34.3 |
| Ex. 24 | 44.1 | 49.0 | 4.9 | 28.1 |
| Ex. 25 | 39.2 | 49.0 | 9.8 | 24.4 |
| Ex. 26 | 34.3 | 49.0 | 14.7 | 35.2 |
| Ex. 27 | 35.2 | 39.2 | 23.6 | 4.7 |
| Ex. 28 | 34.2 | 48.9 | 14.6 | 64.2 |
| Ex. 29 | 36.4 | 46.5 | 15.0 | 37.9 |
| Ex. 30 | 36.4 | 46.5 | 15.0 | 30.0 |
| Ex. 31 | 44.4 | 47.2 | 11.9 | 59.6 |
| Ex. 32 | 38.5 | 47.1 | 20.0 | 62.2 |
| Ex. 33 | 30.8 | 47.5 | 20.0 | 61.0 |
| Ex. 34 | 31.2 | 47.1 | 20.1 | 65.9 |

TABLE 4

| Ex. ID | SS Peel (N/dm) | Si Rubber Peel (N/dm) | SS Shear RT (min) | SS Shear RT Observations | SS Shear HT (min) | Shear HT Observations |
|---|---|---|---|---|---|---|
| CE 1 | NT | NT | NT | NT | NT | NT |
| CE 2 | NT | NT | NT | NT | NT | NT |
| CE 3 | 5.0 | NT | >10,000 | No Failure | NT | NT |
| Ex. 1 | NT | NT | NT | NT | NT | NT |
| Ex. 2 | NT | NT | NT | NT | NT | NT |
| Ex. 3 | 0.3 | NT | 1047.5 | Clean | 28 | Clean |
| Ex. 4 | 0.2 | NT | 72 | Clean | 7 | Clean |
| Ex. 5 | 0.1 | NT | 717 | Clean | NT | NT |
| Ex. 6 | 0.2 | NT | 1430 | Clean | NT | NT |
| Ex. 7 | 0.6 | 1.6 | >10,000 | No Failure | 36.5 | Clean |
| Ex. 8 | 1.3 | 1.1 | 9628 | Clean | 62.2 | Clean |
| Ex. 9 | NT | NT | NT | NT | NT | NT |
| Ex. 10 | 2.1 | NT | 55 | Cohesive | 8.5 | Cohesive |
| Ex. 11 | 3.7 | NT | >10,000 | No Failure | >10,000 | No Failure |
| Ex. 12 | 1.4 | NT | 2480.5 | Clean | 8.5 | Clean |
| Ex. 13 | 0.7 | NT | >10,000 | No Failure | 18.5 | Clean |
| Ex. 14 | 1.0 | NT | 5772 | Clean | NT | NT |
| Ex. 15 | 0.8 | NT | 4969 | Clean | NT | NT |
| Ex. 16 | 3.3 | NT | >10,000 | No Failure | NT | NT |
| Ex. 17 | 0.8 | NT | >10,000 | No Failure | NT | NT |
| Ex. 19 | 0.5 | NT | 2747 | Clean | 27 | Clean |
| Ex. 20 | 1.1 | NT | >10,000 | No Failure | >10,000 | No Failure |
| Ex. 21 | 1.9 | NT | >10,000 | No Failure | >10,000 | No Failure |
| Ex. 18 | 9.3 | 3.6 | >10,000 | No Failure | 159.5 | Clean |
| Ex. 22 | 13.8 | 6.9 | >10,000 | No Failure | 5751.5 | Clean |
| Ex. 23 | 8.5 | 9.5 | >10,000 | No Failure | 237 | Cohesive |
| Ex. 24 | 40.3 | 14.2 | 1125 | Clean | 17 | Clean |
| Ex. 25 | 33.2 | 11.4 | >10,000 | No Failure | 50.5 | Clean |
| Ex. 26 | 14.2 | 2.6 | >10,000 | No Failure | >10,000 | No Failure |
| Ex. 27 | 6.2 | 5.5 | 816 | Clean | 11 | Clean |
| Ex. 28 | 1.4 | 1.7 | >10,000 | No Failure | 234.5 | Clean |
| Ex. 29 | 6.46 | 9.70 | 430 | Cohesive | 77 | Cohesive |
| Ex. 30 | 17.43 | 10.18 | 605 | Clean | 48 | Cohesive |
| Ex. 31 | 0.65 | 2.29 | >10,000 | No Failure | 190 | Clean |
| Ex. 32 | 1.95 | 4.55 | >10,000 | No Failure | 5099 | Clean |
| Ex. 33 | 13.13 | 0.92 | >10,000 | No Failure | >10,000 | No Failure |
| Ex. 34 | 0.60 | 0.47 | >10,000 | No Failure | >10,000 | No Failure |

TABLE 5

| Ex. ID | Transmission % Initial/Aged | Clarity % Initial/Aged | Haze % Initial/Aged |
|---|---|---|---|
| CE 3 | 88.1/88.7 | 92.0/98.7 | 2.9/5.5 |
| Ex. 2 | 87.9/88.5 | 99/99 | 3.3/3.4 |
| Ex. 17 | 81.8/82.4 | 98.8/98.6 | 39.3/40.6 |

The silicone-acrylate IPN's of the present disclosure also demonstrated good optical performance which was stable to long-term high temperature and humidity exposure. Table 5 indicates that the cured material of Example 17 demonstrated a combination of high transmission with high haze. This combination is sought after for use with optoelectronic devices such as solar cells and outdoor displays, especially those making use of point sources such as LED's. Outdoor displays also require stability with exposure to high temperature and humidity as demonstrated by the material of Example 17. In comparison, the silicone-only Example 2 and the acrylate-only Comparative Example 3 both demonstrated high clarity and high transmission but low haze.

To determine temperature resistance, Thermal Gravimetric Analysis (TGA) was performed on the cured materials of Examples 14-17, a commercially available comparative acrylic PSA, and a commercially available comparative silicone PSA lacking the present free radical mediated cure. While the comparative acrylic PSA suffered 30% weight loss at about 270° C., the hybrid acrylic/silicone materials of Examples 14-17 and the comparative silicone PSA did not suffer a 30% weight loss until reaching a temperature of about 400° C. At still higher temperatures the comparative silicone PSA suffered less weight loss than the hybrid acrylic/silicone materials of Examples 14-17.

Comparison of Comparative Examples 1-2 and Example 1 demonstrates the free-radical mediated cationic cure of the silanol polymer. Comparative Example 1 contains only the Bis(4-dodecylphenyl) iodonium triflate and no free-radical photo-initiator (Irgacure 184) while the Comparative Example 2 contains only the free-radical photo-initiator and no Bis(4-dodecylphenyl) iodonium triflate. Neither of Comparative Examples 1 and 2 cured when placed directly under the UV Source 1 and cured under a nitrogen purge for 10 minutes followed by 5 min of thermal exposure at 80° C. in the thermal batch oven. This lack of cure was observed as a coating that was easily smeared after the cure processing. Example 1 contained both the Bis(4-dodecylphenyl) iodonium triflate and the free-radical photo-initiator and when placed directly under the UV Source 1 and cured under a nitrogen purge for 10 minutes followed by 5 min of thermal exposure at 80° C. in the thermal batch oven it formed an intact film with a gel content of 86.6%, demonstrating free radical mediation of the cationic cure.

Examples 1-5 demonstrate that silicone elastomers can be prepared according to the present disclosure possessing with high transmission and clarity and low haze. Further, these optical properties are stable to long-term high temperature and humidity exposure. In addition, these Examples demonstrate silicone elastomer coatings that can be modified with MQ resins to create PSA's with a range of peel adhesions and shear performance at both room temperature and high temperature Example 9-28 demonstrate that the free-radical mediated cure of the silicone can be co-polymerized with free-radically cure acrylics to form an interpenetrating network (IPN). The STEM images of the cured material of Example 17 (19.9% acrylate by weight) appearing as FIGS. 1 and 2 demonstrate a morphology having a continuous silicone-rich phase with discrete spherical inclusions of an acrylic-rich phase, where the acrylic-rich spheres are submicron in size. IPN's of silicone and acrylate may be formulated having optical, mechanical and electrical properties that are useful for a range of applications that include but are not limited to PSA's, gasketing, cushioning, damping, thermal pads, and optical films.

Figure 3:
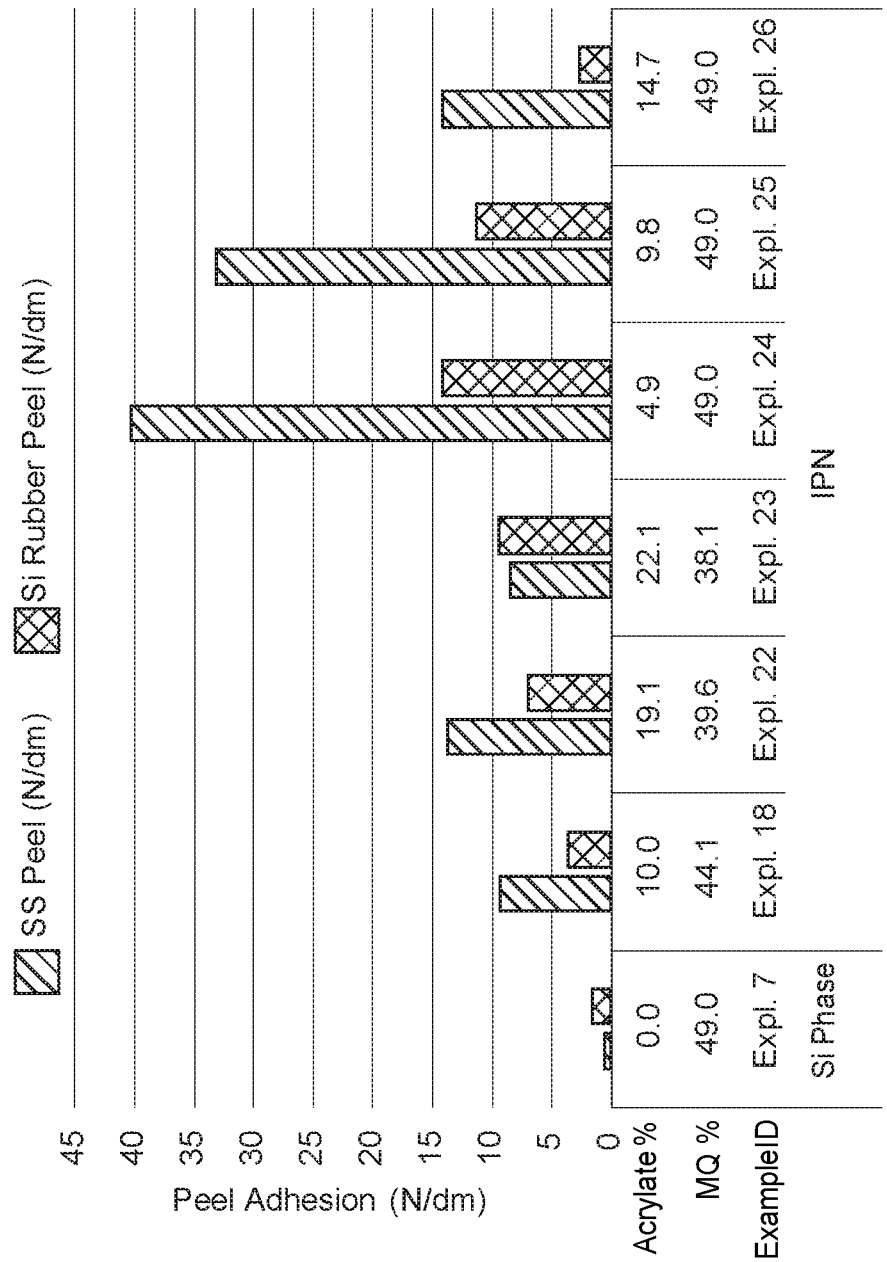
FIG. 3 is a chart presenting stainless steel (SS) and silicone rubber peel adhesion data for Examples 7, 18 & 22-26 of the present disclosure, as described in the Examples section herein.
Figure 4:
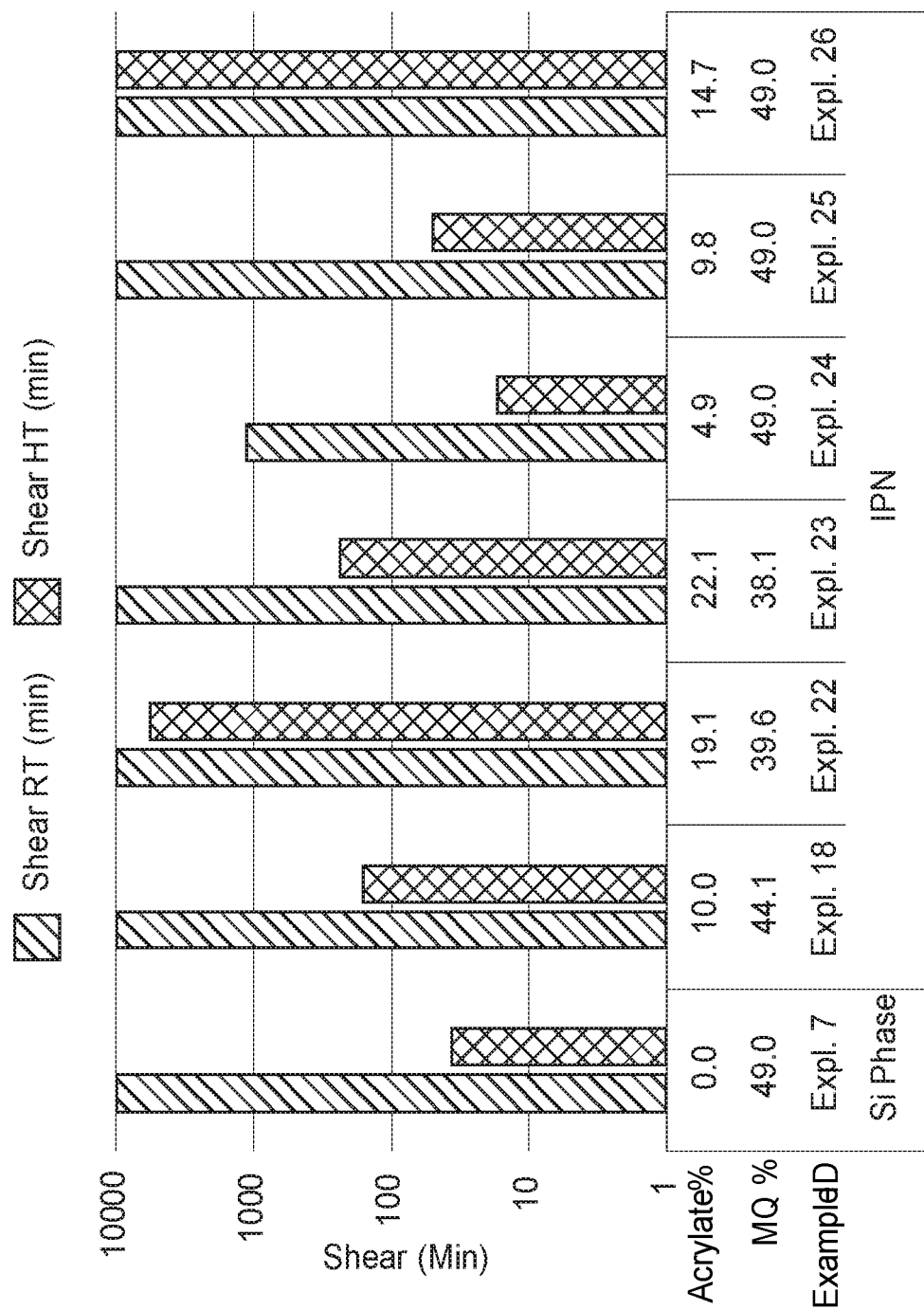
FIG. 4 is a chart presenting stainless steel (SS) room temperature (RT) shear and SS high temperature (HT) shear data for Examples 7, 18 & 22-26 of the present disclosure, as described in the Examples section herein.

The silicone-acrylate IPN's of the present disclosure demonstrate surprisingly good performance as PSA's. In all cases, the peel adhesion performance of the IPN is better than that of the corresponding continuous silicone phase alone. FIG. 3 presents SS and silicone rubber peel adhesion data, comparing IPN PSA Examples 18 & 22-26 to the corresponding silicone-only Example 7. FIG. 4 presents the SS RT shear and SS HT shear data for the same set of Examples. In this subset of Examples, the SS peel performance of IPN PSA Examples 18 & 22-26 achieved 15-73× that of silicone-only Example 7 and the Silicone Rubber peel performance of IPN PSA Examples 18 & 22-26 achieved 2-9× that of silicone-only Example 7, while demonstrating good or superior SS RT shear and SS HT shear performance.

Example 34 was made without alkoxysilane as a silicone crosslinker. Surprisingly, this formulation still had a very high gel %, suggesting that the MQ resin participated in crosslinking, potentially via pendent hydroxyl groups.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A curable composition comprising a mixture of:
   a) a silanol, wherein the silanol is a polysiloxane comprising silanol groups;
   b) a free radical initiator; and
   c) an iodonium salt.

2. The curable composition according to claim 1, additionally comprising:
   d) an alkoxysilane.

3. The curable composition according to claim 2, wherein the alkoxysilane comprises two or more trialkoxysilane groups.

4. The curable composition according to claim 2, wherein the silanol is a silanol-terminated polysiloxane.

5. The curable composition according to claim 1, wherein the silanol is a silanol-terminated polysiloxane.

6. The curable composition according to claim 1, wherein the free radical initiator is a photoinitiator.

7. The curable composition according to claim 1, wherein the iodonium salt comprises a C1-C20 linear or branched alkyl chain substituent.

8. The curable composition according to claim 1, wherein the iodonium salt comprises a triflate counter ion.

9. The curable composition according to claim 1, additionally comprising:
   e) an MQ resin.

10. The curable composition according to claim 1, additionally comprising:
    f) one or more (meth)acrylate monomers.

11. The curable composition according to claim 1, additionally comprising:
    g) one or more multifunctional (meth)acrylate crosslinking monomers comprising two or more (meth)acrylate functional groups.

12. The curable composition according to claim 1 comprising essentially no amount of common solvents.

13. A composition comprising:
a) a cured silicone;
b) a free radical initiator or residue thereof; and
c) an iodonium salt or residue thereof,
wherein the composition is a pressure sensitive adhesive.

14. A composition comprising:
a) a cured silicone;
b) a free radical initiator or residue thereof;
c) an iodonium salt or residue thereof; and
d) a poly(meth)acrylate.

15. The composition according to claim 13, additionally comprising:
e) an MQ resin.

16. The composition according to claim 14, wherein the poly(meth)acrylate is in the form of discontinuous phase of inclusions in a continuous phase of the cured silicone, wherein the inclusions have an average diameter of less than 1.0 micrometer.

17. The composition according to claim 14, which is a pressure sensitive adhesive.

18. The composition according to claim 13 comprising essentially no amount of common solvents.

19. The composition according to claim 14, which is a solid at normal temperature and pressure.

20. The composition according to claim 1, wherein the silanol is a silanol-terminated polydimethylsiloxane.

* * * * *